(12) United States Patent
Haimi-Cohen et al.

(10) Patent No.: US 9,374,231 B2
(45) Date of Patent: Jun. 21, 2016

(54) CONTROLLER PROVIDING GRADUAL TRANSITION OF MULTIPLE TERMINALS FROM UNICAST TRANSMISSION

(75) Inventors: Raziel Haimi-Cohen, Springfield, NJ (US); John Hearn, Chatham, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 642 days.

(21) Appl. No.: 12/728,802

(22) Filed: Mar. 22, 2010

(65) Prior Publication Data
US 2011/0228769 A1 Sep. 22, 2011

(51) Int. Cl.
H04L 12/18 (2006.01)
H04L 29/06 (2006.01)
H04L 12/761 (2013.01)
H04L 12/741 (2013.01)

(52) U.S. Cl.
CPC ............ H04L 12/18 (2013.01); H04L 12/1836 (2013.01); H04L 12/1886 (2013.01); H04L 65/4076 (2013.01); H04L 12/185 (2013.01); H04L 45/16 (2013.01); H04L 45/74 (2013.01); H04L 65/4084 (2013.01)

(58) Field of Classification Search
CPC ....................................................... H04L 12/18
USPC ................. 370/312, 342–390, 432, 328, 498; 455/412.1, 412.2
See application file for complete search history.

(56) References Cited

U.S. PATENT DOCUMENTS 5,724,646 A * 3/1998 Ganek et al. ..................... 725/89
6,028,860 A * 2/2000 Laubach ............ H04Q 11/0478
370/395.64

(Continued)

FOREIGN PATENT DOCUMENTS

CN 101013948 A 8/2007
WO PCTUS2011028913 6/2011

OTHER PUBLICATIONS

B. Ver Steeg et al., "Unicast-Based Rapid Synchronization with RTP Multicast Sessions," AVT, Internet-Draft, Rapid Synchronization for RTP Flows, Jul. 2008, pp. 1-28.

(Continued)

Primary Examiner — Andrew Lai
Assistant Examiner — Andrew C Lee
(74) Attorney, Agent, or Firm — Ryan, Mason & Lewis, LLP

(57) ABSTRACT

A controller in a video headend or other transmission element of a signal distribution system is operative to detect a condition in which unicast transmissions of a given content stream to a plurality of terminals meet a specified threshold. The controller starts a multicast transmission of the given content stream in response to the detected condition, and transitions at least one of the terminals to the multicast transmission. In one embodiment, the controller identifies at least one of the terminals as a terminal that will receive the multicast transmission of the given content stream in place of its unicast transmission prior to one or more of the other terminals receiving the multicast transmission. The controller stops the unicast transmission to the identified terminal if that unicast transmission has already been started, starts the multicast transmission, switches the identified terminal to the multicast transmission, and subsequently transitions one or more of the other terminals to the multicast transmission. The identified terminal may be a leading terminal or a trailing terminal.

22 Claims, 5 Drawing Sheets

(56) References Cited

U.S. PATENT DOCUMENTS

| | | | |
|---|---|---|---|
| 6,708,213 B1* | 3/2004 | Bommaiah et al. | 709/226 |
| 7,073,191 B2* | 7/2006 | Srikantan et al. | 725/87 |
| 7,107,606 B2* | 9/2006 | Lee | 725/87 |
| 7,133,922 B1 | 11/2006 | She et al. | |
| 7,496,675 B2* | 2/2009 | Obata et al. | 709/231 |
| 7,562,375 B2 | 7/2009 | Barrett et al. | |
| 7,574,528 B2* | 8/2009 | Day | H04L 67/24 709/217 |
| 7,627,887 B2* | 12/2009 | Bisher et al. | 725/91 |
| 7,627,997 B2* | 12/2009 | Messenger | E02D 27/02 428/158 |
| 7,788,393 B2* | 8/2010 | Pickens et al. | 709/231 |
| 7,793,329 B2* | 9/2010 | Joshi et al. | 725/120 |
| 8,255,555 B2* | 8/2012 | Takemura et al. | 709/231 |
| 2002/0038374 A1* | 3/2002 | Gupta et al. | 709/231 |
| 2002/0040403 A1* | 4/2002 | Goldhor et al. | 709/231 |
| 2003/0074667 A1* | 4/2003 | Cheung et al. | 725/95 |
| 2004/0034863 A1* | 2/2004 | Barrett | H04N 5/4401 725/38 |
| 2004/0098448 A1 | 5/2004 | Fukushima et al. | |
| 2004/0258003 A1* | 12/2004 | Kokot | H04L 12/185 370/254 |
| 2005/0081244 A1* | 4/2005 | Barrett | H04L 12/185 725/97 |
| 2005/0190781 A1* | 9/2005 | Green et al. | 370/432 |
| 2006/0200574 A1* | 9/2006 | Pickens | H04L 12/185 709/231 |
| 2006/0242240 A1* | 10/2006 | Parker | H04N 7/17318 709/205 |
| 2007/0121629 A1* | 5/2007 | Cuijpers et al. | 370/390 |
| 2007/0147411 A1 | 6/2007 | Bijwaard et al. | |
| 2007/0168523 A1* | 7/2007 | Jiang | H04L 29/06027 709/228 |
| 2007/0211720 A1* | 9/2007 | Fuchs | H04L 12/1868 370/390 |
| 2007/0242655 A1* | 10/2007 | Li | H04L 12/24 370/352 |
| 2007/0242668 A1* | 10/2007 | Barrett | H04L 67/1097 370/390 |
| 2008/0198848 A1* | 8/2008 | Yamagishi | H04N 7/17336 370/390 |
| 2009/0116481 A1 | 5/2009 | Ishii | |
| 2009/0210899 A1* | 8/2009 | Lawrence-Apfelbaum | H04L 12/2801 725/34 |
| 2009/0222873 A1* | 9/2009 | Einarsson | 725/115 |
| 2010/0179987 A1* | 7/2010 | Sebastian | H04L 12/1859 709/203 |

OTHER PUBLICATIONS

U.S. Appl. No. 12/261,175 filed in the name of R. Haimi-Cohen on Oct. 30, 2008 and entitled "Fast Channel Change Request Processing."

* cited by examiner

CONTROLLER PROVIDING GRADUAL TRANSITION OF MULTIPLE TERMINALS FROM UNICAST TRANSMISSION

FIELD OF THE INVENTION

The present invention relates generally to signal distribution systems, and more particularly to techniques for controlling transmission bandwidth in such systems.

BACKGROUND OF THE INVENTION

Signal distribution systems are typically configured to support various transmission protocols for delivery of content. Terminals that are either coupled to or are part of the distribution system may receive the same content. Such content may include, for example, video and associated audio. Inefficiencies arise where the same content is provided to or received by different terminals at different times. Optimization of such systems can result in better bandwidth utilization.

SUMMARY OF THE INVENTION

In unicast transmission, a separate content stream is transmitted to different terminals. For multicast transmission, multiple terminals of the system join a designated multicast group and all terminals in that group receive the same transmitted content stream. One example of a signal distribution system that transmits video content to multiple terminals is a system providing Internet protocol television (IPTV) over digital subscriber line (DSL) or fiber. In such a system, a subscriber or other user is provided with an interface device, such as a set-top box (STB) or receiver, for communicating with network equipment, which may comprise a DSL access multiplexer (DSLAM). The interface device is configured to permit the subscriber to receive, on a television or other presentation device coupled to the interface device at a given location, a content stream corresponding to a selected channel. In order to receive a given selected channel in an IPTV system, the interface device will typically join a corresponding multicast stream. U.S. patent application Ser. No. 12/261,175, filed Oct. 30, 2008 and entitled "Fast Channel Change Request Processing," which is commonly assigned herewith and incorporated by reference herein, discloses illustrative embodiments that significantly reduce the delay between user entry of a channel change command and receipt of decodable multicast data for the new channel.

In IPTV systems and other signal distribution systems, it is often necessary to deliver unicast streams to respective terminals of the system. For example, unicast streams may be used to support applications such as video on demand (VOD) or network personal video recording (NPVR). This creates a problem in that the many required unicast streams can consume an excessive amount of network bandwidth. Although bandwidth could be significantly reduced by combining multiple unicast streams relating to the same content into a single multicast stream, there are numerous challenges in such an approach. For example, multiple terminals may all be receiving the same content via respective unicast streams that are temporally offset from one another. In such a situation, there is no efficient mechanism available to combine all of the unicast streams into a single multicast stream without introducing significant amounts of delay for one or more of the terminals.

The present invention in one or more illustrative embodiments provides techniques for gradually transitioning multiple terminals from unicast to multicast transmission in an IPTV system or other type of signal distribution system.

In accordance with one aspect of the invention, a controller in a video headend or other transmission element of a signal distribution system is operative to detect a condition in which unicast transmissions of a given content stream to a plurality of terminals meet a specified threshold. The controller starts a multicast transmission of the given content stream in response to the detected condition, and transitions at least one of the terminals to the multicast transmission. For example, the controller may identify at least one of the terminals as a terminal that will receive the multicast transmission of the given content stream in place of its unicast transmission prior to one or more of the other terminals receiving the multicast transmission. The controller then stops the unicast transmission to the identified terminal if that unicast transmission has already been started, starts the multicast transmission, switches the identified terminal to the multicast transmission, and subsequently transitions one or more of the other terminals to the multicast transmission.

A first illustrative embodiment provides what is referred to herein as a lead multicast technique. In this technique, the identified terminal is a leading one of the terminals, that is, the terminal that receives or is otherwise designated to receive the given content stream via its unicast transmission earliest in time relative to the other terminals. When the multicast transmission is started, the leading terminal joins that multicast, and the rates at which the given content stream is transmitted to respective ones of the other terminals via their respective unicast transmissions are increased using known rate adjustment mechanisms such as denting or bursting. The term "rate" as used in this context and elsewhere herein is intended to be construed broadly, so as to encompass either an effective data rate or an actual data rate. By way of example, an effective data rate may be increased using a denting mechanism that does not result in an increase in actual data rate, while an actual data rate may be increased using a bursting mechanism. The other terminals are gradually transitioned to the multicast transmission, based on when their respective unicasts "catch up" with the multicast transmission to the leading terminal.

A second illustrative embodiment provides what is referred to herein as a trail multicast technique. In this technique, the identified terminal is a trailing one of the terminals, that is, the terminal that receives or is otherwise designated to receive the given content stream via its unicast transmission latest in time relative to the other terminals. The multicast transmission is started at a rate which is greater that the rates of the respective unicast transmissions, again using known rate adjustment techniques such as denting or bursting. When the multicast transmission is started, the trailing terminal joins that multicast transmission, and rates at which the given content stream is transmitted to respective ones of the other terminals via their respective unicast transmissions remain substantially unchanged until just prior to joining the multicast transmission, at which point one or more of these rates may be increased, for example, to a rate of the multicast transmission. The other terminals are gradually transitioned to the multicast transmission, based on when the multicast transmission "catches up" with their respective unicast transmissions. After the other terminals are transitioned to the multicast transmission, a rate of the multicast transmission may be reduced relative to its rate prior to the transition of the other terminals. For example, the effective rate of the multicast transmission may be reduced to a rate of the unicast transmission of one of the other terminals.

A third illustrative embodiment provides what is referred to herein as a combined lead and trail multicast technique. In this technique, both leading and trailing terminals are identified. A first multicast transmission is started, and the leading terminal is switched to the first multicast transmission. Also, a second multicast transmission is started, and the trailing terminal is switched to the second multicast transmission. Each of the remaining terminals is subsequently transitioned from its unicast transmission to one of the first and second multicast transmissions. The second multicast transmission may have a rate which is greater than a rate of the first multicast transmission. Also, the trailing terminal, and any other ones of the terminals that have been transitioned from their respective unicast transmissions to the second multicast transmission, may be subsequently transitioned from the second multicast transmission to the first multicast transmission.

The illustrative embodiments advantageously reduce bandwidth consumption in a signal distribution system without causing significant amounts of delay or other undesirable impairments such as freezing or dropping in video or other content streams received at the user terminals.

These and other features and advantages of the present invention will become more apparent from the accompanying drawings and the following detailed description.

DETAILED DESCRIPTION OF THE INVENTION

The invention will be described herein in conjunction with illustrative embodiments of signal distribution systems and associated unicast-to-multicast transition techniques. It should be understood, however, that the invention is not limited to use with the particular systems and techniques described, but is instead more generally applicable to any signal distribution system in which it is desirable to provide improved transition of multiple terminals from unicast to multicast transmission so as to reduce bandwidth consumption in the system. For example, although described herein primarily in the context of IPTV systems, the techniques of the invention can also be adapted in a straightforward manner to other types of signal distribution systems, including, for example, WebTV (i.e., Internet TV) systems, cellular systems, cable systems, satellite systems, systems based on Integrated Services Digital Broadcasting-Terrestrial (ISDB-T) and Sistema Brasileiro de Televisão Digital (SBTVD) standards, etc. Also, although illustrated primarily in the context of video distribution, the disclosed techniques can also be applied to transmission of other types of information, such as audio or other types of signals in any combination.

Figure 1:
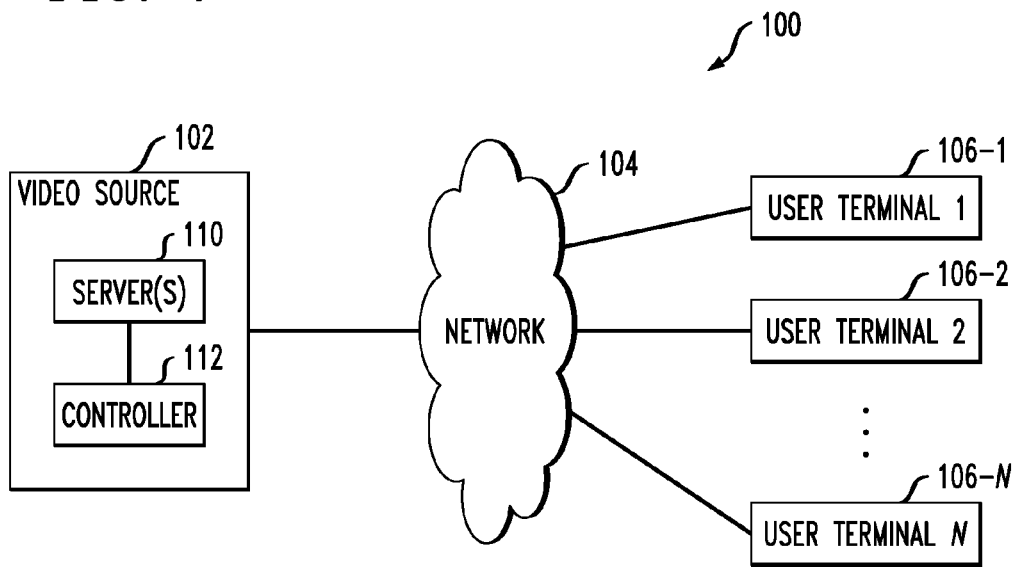
FIG. 1 shows an illustrative embodiment of a signal distribution system in accordance with the invention.

FIG. 1 shows a signal distribution system 100 comprising a video source 102 coupled to multiple user terminals 106-1, 106-2, . . . 106-N via a network 104. The video source 102 comprises one or more servers 110 coupled to a controller 112. As will be described in greater detail below, the controller is configured to implement a gradual transition of multiple ones of the user terminals 106 from respective separate unicast transmissions of the same content stream to receipt of a single multicast transmission of that content stream, in a manner that advantageously avoids the introduction of any significant delay, freezing, dropping or other undesirable impairments in the content as received and displayed at any particular one of the multiple terminals.

The signal distribution system 100 may comprise, by way of example, an IPTV system. The video source 102 may comprise otherwise conventional service provider equipment of an IPTV system, including, for example, head end systems, satellites, servers, gateway routers, etc., suitably modified in the manner disclosed herein. Although the controller 112 in the present embodiment is being shown as separate from the one or more servers 110, the controller in other embodiments may be implemented within such a server or servers, or may be arranged external to the video source 102. The video source is an example of what is more generally referred to herein as a "transmission element" of the signal distribution system. Such a transmission element should be understood to encompass any processing device or set of devices that provides unicast and multicast transmissions to multiple terminals over a network.

The user terminals 106 may each comprise an interface device such as an STB of an IPTV system and possibly an associated display device such as a television. Alternatively, the user terminals may comprise, for example, computers, mobile telephones, personal digital assistants (PDAs), wireless devices, or other processor-based devices, in any combination. Such devices may also be referred to herein as user interface devices or "clients." A given interface or terminal device of this type allows one or more users to access content streams that are delivered to the device via other elements of the signal distribution system. A "terminal" as referred to herein is intended to be broadly construed as any type of processing device or set of devices that receives unicast or multicast transmissions over a network in a signal distribution system for display or other presentation to a user. Such a terminal will generally comprise a processor coupled to a memory, as well as transceiver circuitry for communicating with a video source over a network, and in the illustrative embodiments will typically include functionality to receive and process one or more instructions from a controller directing the terminal to switch from unicast reception to multicast reception.

The network 104 may comprise any type of communication network suitable for transporting signals associated with the provision of television services or other types of content delivery services, and the invention is not limited in this regard. For example, portions of the network 104 may comprise a wide area network such as the Internet, a metropolitan area network, a local area network, a cable network, a telephone network, a satellite network, as well as portions or combinations of these or other networks.

The particular signal distribution system configuration shown and described in conjunction with FIG. 1 should be viewed as an illustrative example of such a system, and it is to be understood that the invention can be implemented using other types and configurations of system components. A more detailed example of a signal distribution system in another embodiment of the invention will be described below in conjunction with FIG. 8.

Figure 2:
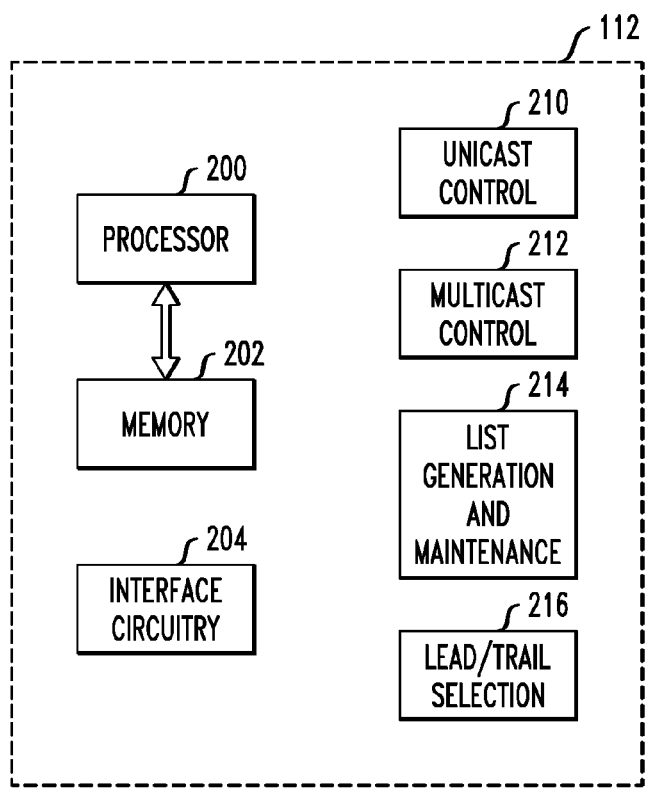
FIG. 2 is a more detailed view of a controller of the FIG. 1 signal distribution system in an illustrative embodiment.

Referring now to FIG. 2, one possible implementation of controller 112 of the FIG. 1 system is shown. In this embodiment, the controller comprises a processor 200 coupled to a memory 202, and further comprises interface circuitry 204. Also included in the controller are modules 210-216, more specifically including a unicast control module 210, a multicast control module 212, a list generation and maintenance module 214, and a lead and/or trail selection module 216.

The processor 200 may be implemented as a microprocessor, a microcontroller, an application-specific integrated circuit (ASIC) or other type of processing device, as well as portions or combinations of such devices. The memory 202 may comprise an electronic random access memory (RAM), a read-only memory (ROM), a disk-based memory, or other type of storage device, as well as portions or combinations of such devices. The processor and memory are used in storage and execution of one or more software programs for implementing gradual transitions of multiple terminals from unicast to multicast transmission using the techniques disclosed herein. The various modules 210-216 may be implemented at least in part using such software. The memory 202 may be viewed as an example of what is more generally referred to herein as a computer program product or still more generally as a computer-readable storage medium that has executable program code embodied therein. Other examples of computer-readable storage media may include disks or other types of magnetic or optical media, in any combination.

The processor 200, memory 202 and interface circuitry 204 may comprise well-known conventional circuitry suitably modified to operate in the manner described herein. Conventional aspects of such circuitry are well known to those skilled in the art and therefore will not be described in detail herein.

It is to be appreciated that a given controller as disclosed herein may be implemented using components and modules other than those specifically shown in the exemplary arrangement of FIG. 2.

The operation of the controller 112 in illustrative embodiments will now be described with reference to FIGS. 3 through 7. These illustrative embodiments implement what are referred to herein as bandwidth "annealing" techniques, in which one or more particular terminals are identified in a set of terminals receiving or designated to receive respective unicast transmissions of a given content stream, an identified terminal is first transitioned to a multicast transmission, and one or more of the other terminals in the set are gradually transitioned over to the multicast transmission.

Figure 3:
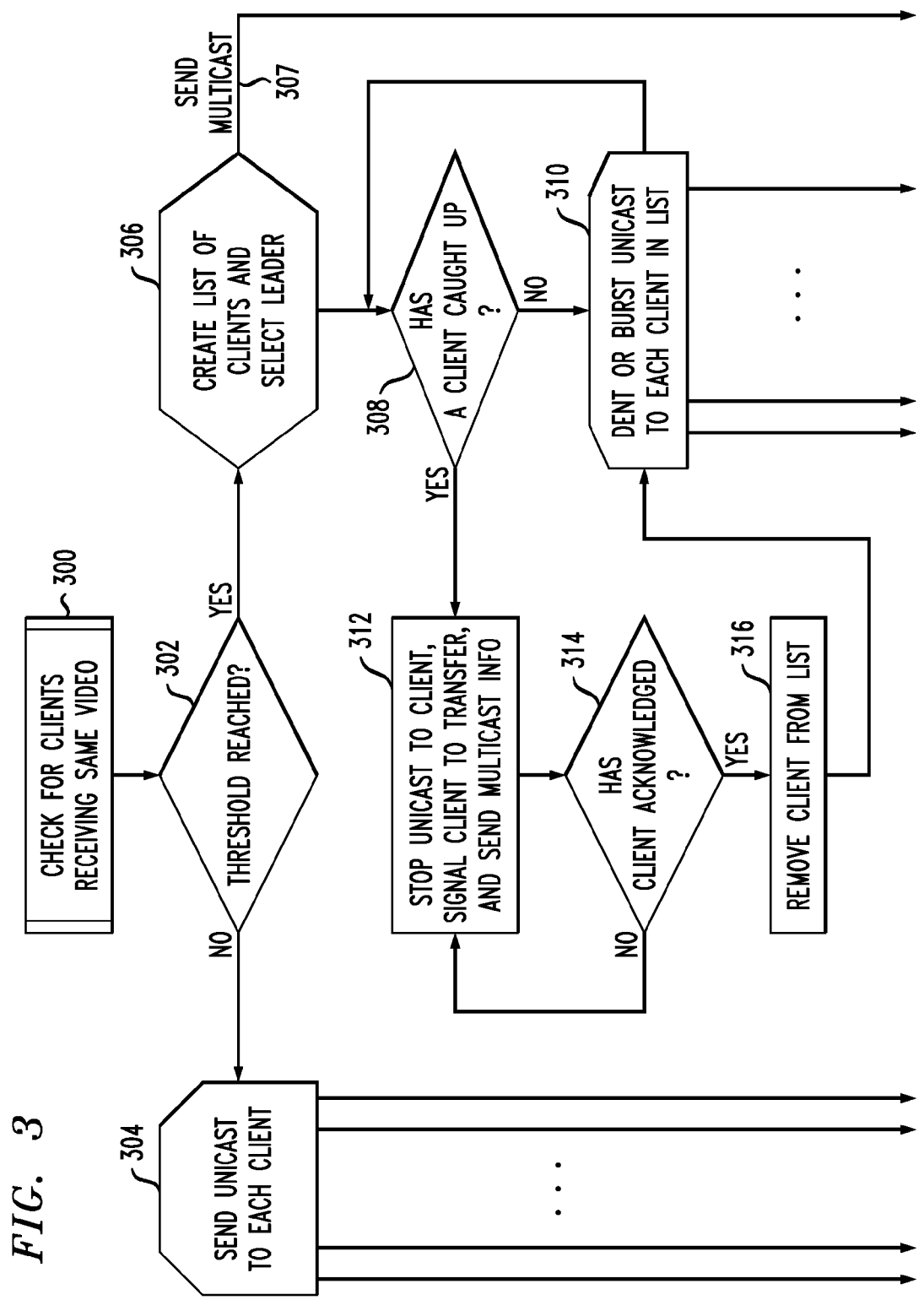
FIG. 3 is a flow diagram showing the operation of the controller of FIG. 2 in an illustrative embodiment.

Referring now to FIG. 3, the operation of the controller 112 in one embodiment is shown. In this embodiment, the particular annealing technique applied is called lead multicast annealing, as the above-noted identified terminal is the leading terminal in the set, that is, the terminal that receives the given content stream via its unicast transmission earliest in time relative to the other terminals in the set. The lead multicast technique in this embodiment includes steps 300 through 316 as shown.

In step 300, the controller 112 is triggered to check for clients receiving the same video stream via respective unicast transmissions. Such triggering may be, for example, periodic (e.g., driven by a clock), or event driven (e.g., a client's request for a video stream causes the controller to check for other clients receiving the same stream). As indicated previously, the term "clients" in this context refers to respective ones of the terminals 106.

A determination is made in step 302 as to whether or not the set of clients receiving the same video stream via respective unicast transmissions have reached a specified threshold. This may involve, for example, determining if a designated minimum number of clients are receiving or designated to receive the same video stream via respective unicast transmissions. The specified threshold in other embodiments may be more complex, possibly incorporating, by way of example, a maximum temporal offset between adjacent pairs of clients. That is, in addition to the requirement that a specified minimum number of terminals be receiving or designated to receive the same content stream via unicast, the offset in time between such unicasts may be required to be within a designated maximum value. This can help to ensure that the terminals can all transition to the multicast without requiring an excessive amount of buffering in any particular terminal. Such a maximum temporal offset may be expressed in units of time, or in terms of number of frames, packets, bytes, etc.

If it is determined in step 302 that the specified threshold has not been met, then the system continues to send separate unicast transmissions of the video stream to the respective clients in step 304. On the other hand, if it is determined in step 302 that the specified threshold has been met, the process moves to step 306 as indicated. It should be noted that the check in step 300 can be repeatedly triggered from time to time, possibly leading to one or more repetitions of the threshold determination in step 302.

In step 306, a list is created of the clients receiving the same video content via respective unicast transmissions. This list will generally include those clients receiving the same video content that are capable of being transitioned to multicast, and thus may exclude some clients that are also receiving that same video content but do not have sufficient buffering capacity to support a transition to multicast. Then a multicast stream of the same content is created and the clients in the list are gradually transitioned to this multicast stream. In the lead multicast annealing technique, a leader among the clients in the list is selected, and a multicast stream, intended to take the place of the unicast transmission to the selected client, is started as shown in step 307. Then the unicast stream to the selected client is stopped and that client is instructed to join the multicast stream. Once the selected client joins the multicast, the multicast transmission takes the place of the unicast transmission to the selected client and that client is therefore transitioned from unicast transmission to multicast transmission. In this particular lead multicast embodiment, the leader is the terminal that receives the given content stream via its unicast transmission earliest in time relative to the other terminals in the set, also referred to above as the leading terminal.

It should be noted that a terminal is generally not supposed to receive unicast and multicast concurrently because this may exceed the available bandwidth in the associated subscriber loop. Since joining the multicast may take up to a few hundred milliseconds (e.g., from sending an IGMP join request until receiving the first multicast packet) the stopping of the unicast can occur when the unicast is ahead of the multicast by at least that much time. One way to achieve this is to increase the rate of the unicast stream to the selected terminal, by the use of denting (e.g., increasing the effective data rate by skipping less important parts of the video) or bursting (e.g., increasing the actual data rate), prior to stopping the unicast and instructing the selected terminal to join the multicast.

The other terminals are subsequently transitioned from unicast transmission to multicast transmission in a gradual manner, based on when their respective unicasts "catch up" with the multicast transmission to the leading terminal. This portion of the process is shown in steps 308 through 316.

In step 308, a determination is made as to whether or not any particular remaining unicast client on the list created in step 306 has caught up with the multicast sent as indicated at 307 to the leader identified in step 306. If no client on the list has caught up with the multicast, the process moves to step 310. In this step, the unicast transmission rates to respective ones of the remaining clients are increased using known techniques such as denting or bursting. From step 310, the determination in step 308 is repeated.

If the determination in step 308 is that a particular one of the remaining clients on the list has caught up with the multicast, the unicast to that particular client is stopped, and that client is signaled to transfer to the multicast and is sent the multicast information, as indicated in step 312.

Once the client acknowledges the transfer in step 314, the client is removed from the list in step 316. The process then returns to step 310 to continue the higher rate unicast transmissions to the remaining clients on the list until one or more of them also catch up to the multicast.

It should be noted that the acknowledgement in step 314 is optional, and may be eliminated in other embodiments. For example, if for some reason the client misses the signal to transfer to the multicast in step 312, the client will notice that the unicast has stopped and report it to the video source, which may then take appropriate steps, such as signaling to the client again to join the multicast.

Various operations in the flow diagram of FIG. 3 may be implemented using associated controller modules as shown in FIG. 2. For example, the unicast transmissions in steps 304 and 310 may be controlled by the unicast control module 210. Similarly, the multicast transmission indicated at 307 may be controlled by the multicast control module 212. The list generation and maintenance operations referred to in steps 306 and 316 may be performed by module 214, and the lead selection operation referred to in step 306 may be performed by module 216. Of course, the particular processing operations of FIG. 3 and associated module configuration of FIG. 2 are for purposes of illustration only, and should not be construed as limiting the scope of the invention in any way.

A detailed example of the lead multicast annealing of FIG. 3 will now be described with reference to FIGS. 4 and 5.

Figure 4:
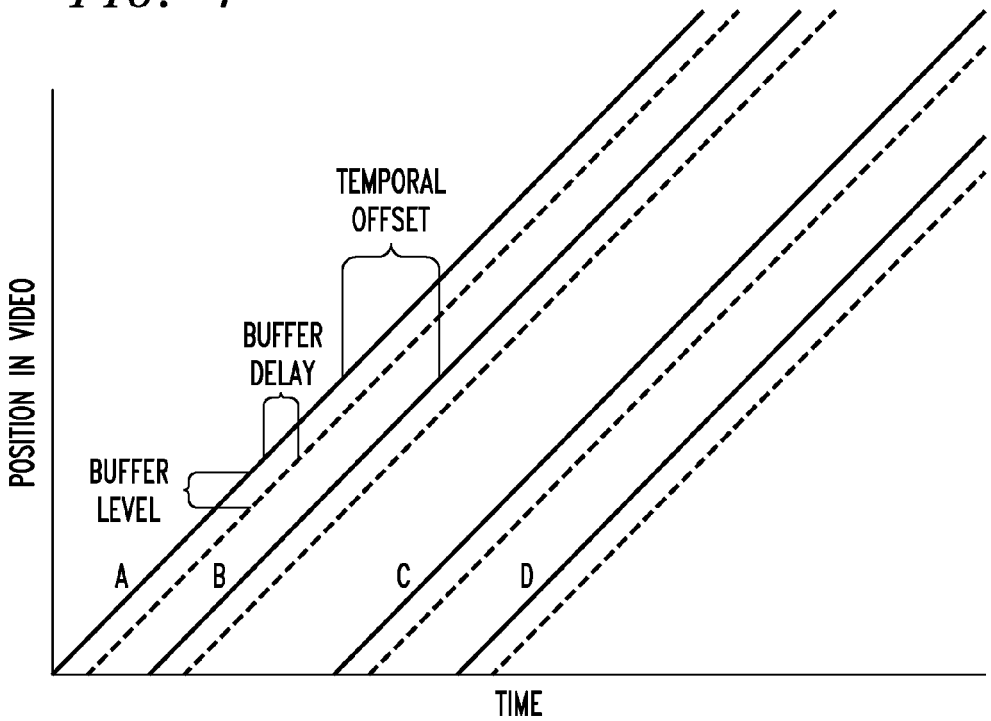
FIG. 4 shows an example of several user terminals of the FIG. 1 system receiving the same content via respective time-shifted unicast streams.

FIG. 4 shows unicast transmissions of the same video content to respective ones of four terminals A, B, C and D. The horizontal axis in the figure denotes time, and the vertical axis denotes the position in the video stream, or in other words the offset into the transmitted content (e.g., byte offset into the corresponding video file). Each terminal is represented by a solid line and a dashed line. The solid line shows reception of video over time at the terminal, and the dashed line shows consumption of video over time at that terminal. The vertical gap between those two lines for a given terminal is the amount of video buffered at that terminal at any given time. The horizontal gap is the delay introduced by the buffering (e.g., from the time a video packet is received by the terminal until it is consumed).

Although shown as straight lines in the figure, the solid and dashed lines can deviate from this linear constant bit rate appearance. For example, fluctuations around the solid line may be caused by network jitter, and fluctuations around the dashed line may be caused by the fact that video frames have different sizes, but are consumed at a fixed frame rate. The average gap between the solid reception line and the dashed consumption line should be wide enough to guarantee that despite the fluctuations, the reception line will always be ahead of the consumption line (e.g., earlier in time or left of it in the figure). This will avoid freezing, skipping and other impairments in the displayed video.

It is apparent from FIG. 4 that terminal A is the leading terminal, in that it receives the given content stream via its unicast transmission earliest in time relative to the other terminals B, C and D. Similarly, terminal D is the trailing terminal, in that it receives the given content stream via its unicast transmission latest in time relative to the other terminals A, B and C. The temporal offset between a given pair of terminals on the horizontal axis (e.g., A and B) in this example is the difference in time between receipt of a particular packet or other designated part of the video stream at one terminal (e.g., terminal A) and the receipt of that same part of the video stream at the next terminal in time (e.g., terminal B).

Figure 5:
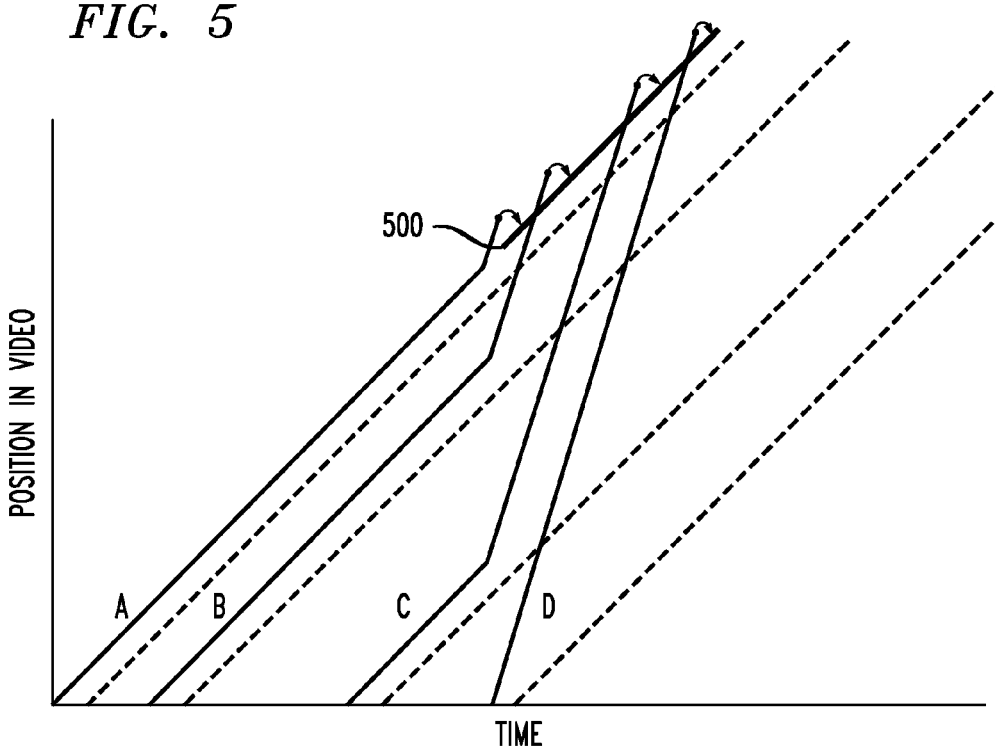
FIG. 5 illustrates the manner in which the terminals of FIG. 4 are gradually transitioned to a single multicast stream using a lead multicast technique of the present invention.

Referring now to FIG. 5, the operation of the lead multicast process of FIG. 3 is illustrated. Assuming that the threshold in step 302 is four or more terminals, the threshold is reached when terminal D begins to receive or is designated to receive its unicast transmission. It should be noted that D need not actually receive any portion of its unicast, but may instead have simply requested video content that would normally be delivered to D via unicast transmission. Such a situation is intended to be encompassed by the general recitation of a terminal being "designated to receive" a unicast transmission, which simply means that the terminal would receive a unicast transmission absent application of a bandwidth annealing technique as disclosed herein.

At this stage, the list of terminals includes terminals A, B, C and D, and terminal A is designated as the leader. Terminal A is therefore transitioned from unicast to multicast. The multicast is shown in FIG. 5 as the thicker portion of the solid line for terminal A, beginning at point 500 as indicated. As part of this transition, the server 110 stops sending unicast to terminal A, and that terminal then joins the multicast. It should be noted that the rate of the unicast to the lead terminal in this example is increased for a short time before it is stopped, in order to facilitate a smooth transition from unicast to multicast. The other terminals begin receiving video at an increased rate, for example, through denting or bursting as previously noted. This is shown by an increased slope of the solid reception lines for terminals B, C and D. The increase in slope in the figure is exaggerated for illustrative purposes, but typically would be an additional 5% to 25% relative to the normal video rate.

The increased rate unicast transmissions to terminals B, C and D will eventually allow those terminals to catch up to the multicast, which in this embodiment is at the same rate as the previous unicast transmission to terminal A. As each of the increased rate unicast transmissions reaches and passes the multicast transmission, that unicast transmission is stopped and the corresponding terminal is switched to the multicast, e.g., instructed to join the multicast. All of the remaining terminals B, C and D are therefore eventually transitioned from unicast to multicast transmission.

As mentioned previously, a terminal is generally not supposed to receive unicast and multicast concurrently. Since joining the multicast may take up to a few hundred milliseconds (e.g., from sending an IGMP join request until receiving the first multicast packet) the stopping of the unicast can occur when the unicast is ahead of the multicast (i.e., to the left of it in the figure) by at least that much time. However, no harm is done if the terminal waits longer as a safety measure. For example, if the unicast is stopped only when the unicast is two seconds ahead there would be no problem or loss of data.

Once all of the terminals have joined the multicast, the amount of buffering required for each of terminals B, C and D is given by the vertical gap between the multicast and its corresponding consumption line. This vertical gap is significantly larger than it would otherwise be absent joining the multicast, and is largest at the trailer terminal D. However, modern devices typically have a large amount of available memory so this additional buffering requirement should not pose a problem.

In an extension of this embodiment of the invention, a new client requests the same video content, after the multicast stream has started, or even after all clients have joined the multicast. That client may receive a unicast stream at an increased rate, by the use of denting or bursting, and once the unicast to that client catches up with the multicast, the client is instructed to join the multicast. Thus bandwidth annealing is not limited to clients which are already receiving video content when the operation begins.

In a further embodiment of the invention, when a client makes a request for a video stream, it includes in the request an indication of the maximal buffering which it can support, and controller 112 may use this information in making its decision as shown in steps 302 and 306.

Figure 6:
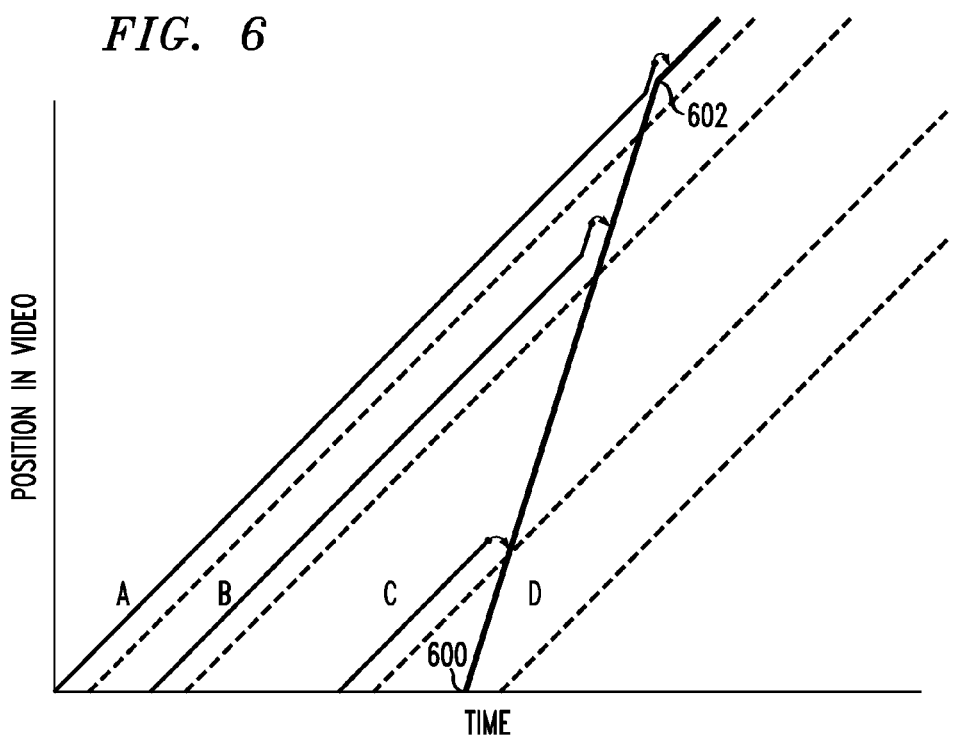
FIG. 6 illustrates the manner in which the terminals of FIG. 4 are gradually transitioned to a single multicast stream in a trail multicast technique of the present invention.

FIG. 6 illustrates an alternative approach referred to herein as trail multicast annealing. In this approach, when terminal D requests a unicast transmission of the same video stream currently also being supplied via unicast to terminals A, B and C, a decision is made to move all four terminals to one common multicast transmission. However, instead of sending the multicast initially to the leading terminal A, it is instead sent first to the trailing terminal D. The trailing terminal D therefore starts receiving multicast at point 600, as indicated by the thicker solid reception line. Initially the multicast stream is sent at an accelerated rate, higher than a real time video rate, either through denting or bursting. When the multicast stream gets sufficiently close to one of the reception lines of terminals A, B or C, the unicast to that terminal is stopped and that terminal is instructed to join the multicast. Once leader A has joined the multicast, the rate of the multicast is dropped at point 602 to its normal rate, corresponding generally to a real time video rate.

At steady state, after all of the terminals have joined the multicast, the lead multicast and trail multicast approaches yield the same result. However, each approach has certain advantages relative to the other, as outlined below.

An advantage of trail multicast over lead multicast is that with trail multicast there is at any given time only one stream at an accelerated rate (i.e., the multicast stream), thus conserving network bandwidth.

Another advantage of trail multicast is that the first terminal to receive the multicast, the trailing terminal, does not need to be switched from unicast transmission to multicast transmission. Instead, it can be started directly in multicast.

An advantage of lead multicast over trail multicast is that the transition from unicast to multicast is simpler in lead multicast. In trail multicast, just as in lead multicast, the unicast should stop only when it is at least a few hundred milliseconds ahead of the multicast in order to prevent a discontinuity or other impairment in the incoming video. This introduces a "no earlier than" constraint for the transition in lead multicast and a "no later than" constraint for the transition in trail multicast. In addition, in trail multicast the transition cannot be too early or it may cause the reception line of a given terminal (which follows the multicast after the transition) to be behind the consumption line of that terminal. Therefore, in trail multicast there is a finite interval in which the unicast may be stopped to allow seamless transition. This difficulty may be alleviated by accelerating the unicast rate shortly before it is stopped so the unicast and multicast run "side by side" for a short time (as shown for terminals A and B in FIG. 6).

Another advantage of lead multicast is that it allows transitioning of new clients to the multicast after the bandwidth annealing operation starts, which is generally not feasible with trail multicast.

It should be noted that in lead multicast, the unicast to a terminal such as terminal B that is relatively near in time to terminal A is stopped relatively early in the process, while the unicasts to terminals C and D have to be continued for a longer time until they catch up with the multicast. In trail multicast, this situation is reversed, in that the terminals A and B take longer until their unicasts may be stopped than terminals C and D.

Figure 7:
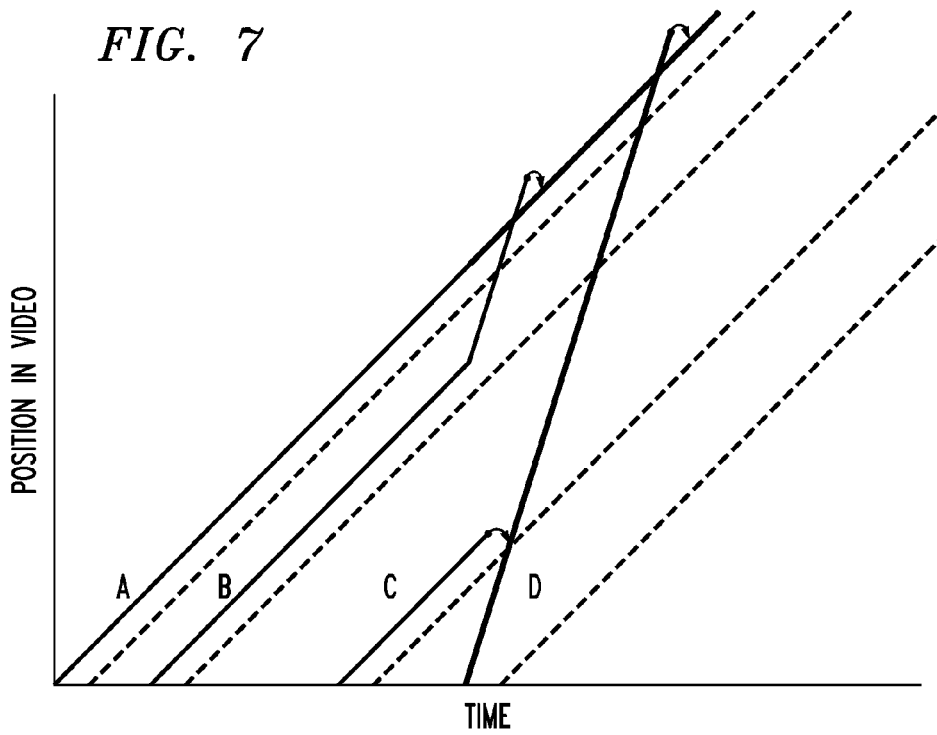
FIG. 7 illustrates the manner in which the terminals of FIG. 4 are gradually transitioned to a single multicast stream in a combined lead and trail multicast technique of the present invention.

FIG. 7 illustrates a combined lead multicast and trail multicast approach that allows all of the unicast streams to be stopped quickly. In this approach, when D requests the same video stream already being received by terminals A, B and C via separate unicasts, D is assigned an accelerated multicast stream as in the trail multicast approach of FIG. 6. At substantially the same time the leading terminal A is put on a multicast at its normal rate as in the lead multicast approach of FIG. 5. Terminal B is near the lead so its unicast rate is accelerated and it eventually joins the multicast of A. Terminal C is near the trailing terminal D so it is kept at its normal unicast rate and it eventually switches to the trail multicast of D when the latter gets into the right switching interval. Thus, all of the unicast channels are transitioned to one of the multicasts fairly early in the process. When the trail multicast gets ahead of the lead multicast, all the terminals on it (terminals C and D in this example) are instructed to join the lead multicast, and the trail multicast is stopped.

The exemplary bandwidth annealing techniques of FIGS. 5, 6 and 7 provide gradual transition of terminals from unicast to multicast transmission, and can significantly reduce bandwidth requirements of a signal distribution system by reducing the duplication of transmission in an efficient manner that does not lead to undesirable impairments in the received and displayed video.

Figure 8:
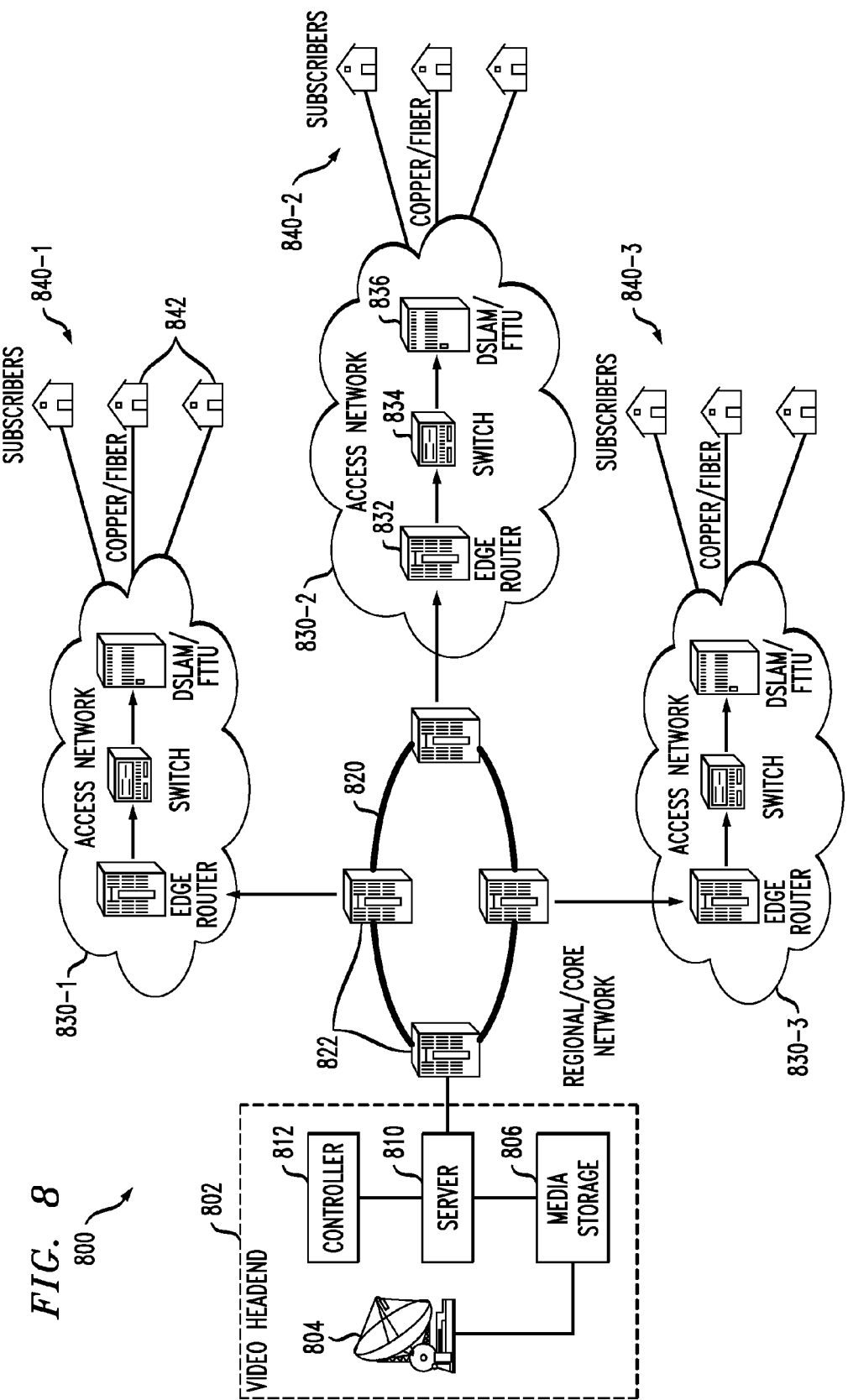
FIG. 8 is a block diagram of a signal distribution system in another embodiment of the invention.

FIG. 8 shows another embodiment of a signal distribution system 800 that implements gradual transition of multiple terminals from unicast to multicast transmission using the bandwidth annealing techniques disclosed herein. In this embodiment, system 800 comprises a video headend 802 that includes a satellite receiver 804 coupled to a media storage unit 806. The media storage unit receives a video signal from receiver 804 and stores it for delivery to a server 810. The video headend may include additional elements of a conventional nature, such as one or more encoders.

The headend 802 is the source of video in the network 800. However, it should be appreciated that it need not be the ultimate source of video. For example, headend 802 may belong to another higher level network from which it receives the video content which it delivers to network 800.

The server 810 is coupled to a controller 812 that is assumed to be configured similarly to controller 112 as shown in FIG. 2. The server is also coupled to a core network 820 that includes edge routers 822. Edge routers of the core network 820 are coupled to respective edge routers of access networks 830-1, 830-2 and 830-3. Each such access network more particularly comprises an edge router 832, a switch 834, and an additional network element 836 illustratively comprising a DSLAM and/or a Fiber to the User (FTTU) interface unit. The access networks 830-1, 830-2 and 830-3 are coupled to respective sets of subscribers 840-1, 840-2 and 840-3, with each such subscriber being associated with a residence or business location 842.

In operation, the controller 812 interacts with server 810 to detect particular ones of the subscribers that are receiving or designated to receive the same content from video headend 802 via unicast, and automatically transitions particular ones of those subscribers to a shared multicast using one or more of the lead multicast, trail multicast or combined lead and trail multicast techniques as previously described.

The decision on when to start bandwidth annealing for a given group of clients may depend not only on factors such as the number of clients receiving the same content or the relative delays among them, but also on where in the system those clients are located. For example, the core network 820 of system 800 may have a high bandwidth capacity, so its threshold for bandwidth annealing may be 10 clients. The access networks 830 may have a lower bandwidth capacity, and so 4 clients may be the threshold there. In this case, the rule may be specified as follows: "Begin bandwidth annealing if there are at least 4 clients from the same access network or a total of 10 clients from all networks."

In other embodiments, there may be one or more intermediate levels of networks between the core network 820 and the access networks 830, each with its own constraints. Such intermediate networks may include, for example, a metropolitan network. The video headend 802 may not be aware of the specific thresholds of each of the lower level networks and it may not even know the particular networks to which each client belongs. An additional controller may therefore be provided at the access network (e.g., part of or coupled to an edge router) which monitors client requests for video content and if the annealing constraint for that network has been reached, it sends a request to the controller 812 requesting bandwidth annealing of those clients.

It should be emphasized that the system 800 is just one possible implementation of a signal distribution system in accordance with the invention. Numerous other systems may be configured to implement one or more aspects of the present invention. For example, in other embodiments, one or more of the access networks 830 may be replaced by a gateway to a cellular network.

As indicated above, embodiments of the present invention may be implemented at least in part in the form of one or more software programs that are stored in a memory or other computer-readable medium of a video headend or other transmission element of a signal distribution system. System components such as the modules 210, 212, 214 and 216 may be implemented at least in part using software programs. Of course, numerous alternative arrangements of hardware, software or firmware in any combination may be utilized in implementing these and other system elements in accordance with the invention. For example, embodiments of the present invention may be implemented in one or more field-programmable gate arrays (FPGAs), application-specific integrated circuits (ASICs) or other types of integrated circuit devices, in any combination. Such integrated circuit devices, as well as portions or combinations thereof, are examples of "circuitry" as the latter term is used herein.

It should be noted that the term "unicast" and "multicast" as used herein are intended to be construed broadly so as to encompass a wide variety of different techniques for one-to-one and one-to-many transmission, respectively.

Again, although illustrated in the context of IPTV, the described techniques can be adapted in a straightforward manner for use in other types of signal distribution systems, such as cellular systems, cable and satellite television systems, etc. As one example, the controller 112 associated with the video source 102 in the FIG. 1 embodiment may be implemented, for example, in a base station of a cellular system which delivers television signals to mobile devices. Such a base station is another example of a "transmission element" as the latter term is used herein.

It should again be emphasized that the embodiments described above are for purposes of illustration only, and should not be interpreted as limiting in any way. Other embodiments may use different types of system components, networks, device configurations, and communication media, depending on the needs of the particular content delivery application. Alternative embodiments may therefore utilize the techniques described herein in other contexts in which it is desirable to implement efficient transition of multiple terminals from separate unicasts to a shared multicast. Also, it should also be noted that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method comprising:
   identifying a plurality of terminals receiving a given content stream via respective unicast transmissions, two or more of the unicast transmissions being temporally offset from one another;
   starting a multicast transmission of the given content stream responsive to detecting that the unicast transmissions of the given content stream meet a first threshold;
   identifying a first one of the plurality of terminals based on temporal offsets between a unicast transmission to the first terminal and respective unicast transmissions to remaining ones of the plurality of terminals;
   transitioning the first terminal to the multicast transmission;
   adjusting relative rates of the multicast transmission and the respective unicast transmissions to the remaining ones of the plurality of terminals; and
   transitioning another one of the plurality of terminals to the multicast transmission responsive to detecting that a temporal offset between the multicast transmission and a unicast transmission to the other terminal is less than a second threshold;
   wherein the method is implemented by at least one processing device comprising a processor coupled to a memory.

2. The method of claim 1 wherein the first threshold comprises a designated number of unicast transmissions.

3. The method of claim 1 wherein the first threshold comprises a designated number of unicast transmissions within a designated temporal offset.

4. The method of claim 1 further comprising repeating transitioning another one of the plurality of terminals to the multicast transmission until each of the plurality of terminals is transitioned to the multicast transmission.

5. The method of claim 1 wherein transitioning the first terminal to the multicast transmission comprises:
   increasing a rate of the unicast transmission to the first terminal for a first period of time;
   stopping the unicast transmission to the first terminal after the first period of time; and transitioning the first terminal to the multicast transmission after stopping the unicast transmission to the first terminal.

6. The method of claim 1 wherein the temporal offset between the multicast transmission and the unicast transmission to the other terminal comprises a time difference between receipt of a designated part of the given content stream at the first terminal and receipt of the designated part of the given content stream at the other terminal.

7. The method of claim 1 wherein the first terminal comprises a leading terminal that receives the given content stream earliest in time relative to the remaining ones of the plurality of terminals.

8. The method of claim 7 wherein adjusting relative rates of the multicast transmission and the respective unicast transmissions to the remaining ones of the plurality of terminals comprises increasing the rate of at least one of the unicast transmissions relative to the multicast transmission.

9. The method of claim 1 wherein the first terminal comprises a trailing terminal that receives the given content stream latest in time relative to remaining ones of the plurality of terminals.

10. The method of claim 9 wherein adjusting relative rates of the multicast transmission and the respective unicast transmissions to the remaining ones of the plurality of terminals comprises increasing the rate of the multicast transmission relative to at least one of the unicast transmissions.

11. The method of claim 1 wherein starting the multicast transmission comprises:
starting a first multicast transmission of the given content stream; and
starting a second multicast transmission of the given content stream.

12. The method of claim 11 wherein identifying the first terminal comprises identifying the first terminal and a second terminal, the first terminal comprising a leading terminal that receives the given content stream earliest in time relative to the remaining ones of the plurality of terminals and the second terminal comprising a trailing terminal that receives the given content stream latest in time relative to remaining ones of the plurality of terminals.

13. The method of claim 12 wherein transitioning the first terminal comprises:
transitioning the first terminal to the first multicast transmission; and
transitioning the second terminal to the second multicast transmission.

14. The method of claim 13 wherein adjusting relative rates of the multicast transmission and the respective unicast transmissions to the remaining ones of the plurality of terminals comprises adjusting relative rates of the first multicast transmission, the second multicast transmission and the respective unicast transmissions.

15. The method of claim 14 wherein transitioning another one of the plurality of terminals comprises at least one of:
transitioning a first other one of the plurality of terminals to the first multicast transmission responsive to detecting that a temporal offset between the first multicast transmission and a unicast transmission to the first other terminal is less than the second threshold; and
transitioning a second other one of the plurality of terminals to the second multicast transmission responsive to determining that a temporal offset between the second multicast transmission and a unicast transmission to the second other terminal is less than a third threshold.

16. The method of claim 15 further comprising repeating transitioning another one of the plurality of terminals until each of the plurality of terminals is transitioned to one of the first multicast transmission and the second multicast transmission.

17. The method of claim 16 further comprising:
adjusting relative rates of the first multicast transmission and the second multicast transmission; and
transitioning terminals from the second multicast transmission to the first multicast transmission responsive to detecting that a temporal offset between the first multicast transmission and the second multicast transmission is less than a fourth threshold.

18. An apparatus comprising:
a memory; and
a processor coupled to the memory and configured:
to identify a plurality of terminals receiving a given content stream via respective unicast transmissions, two or more of the unicast transmissions being temporally offset from one another;
to start a multicast transmission of the given content stream responsive to detecting that the unicast transmissions of the given content stream meet a first threshold;
to identify a first one of the plurality of terminals based on temporal offsets between a unicast transmission to the first terminal and respective unicast transmissions to remaining ones of the plurality of terminals;
to transition the first terminal to the multicast transmission;
to adjust relative rates of the multicast transmission and the respective unicast transmissions to the remaining ones of the plurality of terminals; and
to transition another one of the plurality of terminals to the multicast transmission responsive to detecting that a temporal offset between the multicast transmission and a unicast transmission to the other terminal is less than a second threshold.

19. The apparatus of claim 18 wherein:
the first terminal comprises a leading terminal that receives the given content stream earliest in time relative to the remaining ones of the plurality of terminals; and
the processor is further configured to adjust relative rates of the multicast transmission and the respective unicast transmissions to the remaining ones of the plurality of terminals by increasing the rate of at least one of the unicast transmissions relative to the multicast transmission.

20. The apparatus of claim 18 wherein:
the first terminal comprises a trailing terminal that receives the given content stream latest in time relative to remaining ones of the plurality of terminals; and
the processor is further configured to adjust relative rates of the multicast transmission and the respective unicast transmissions to the remaining ones of the plurality of terminals by increasing the rate of the multicast transmission relative to at least one of the unicast transmissions.

21. The apparatus of claim 18 wherein the processor is further configured:
to start the multicast transmission by starting a first multicast transmission of the given content stream and starting a second multicast transmission of the given content stream;
to identify the first terminal by identifying the first terminal and a second terminal, the first terminal comprising a leading terminal that receives the given content stream earliest in time relative to the remaining ones of the plurality of terminals and the second terminal comprising a trailing terminal that receives the given content stream latest in time relative to remaining ones of the plurality of terminals;

to transition the first terminal by transitioning the first terminal to the first multicast transmission and transitioning the second terminal to the second multicast transmission;

to adjust relative rates of the multicast transmission and the respective unicast transmissions to the remaining ones of the plurality of terminals by adjusting relative rates of the first multicast transmission, the second multicast transmission and the respective unicast transmissions;

to transition another one of the plurality of terminals by at least one of: transitioning a first other one of the plurality of terminals to the first multicast transmission responsive to detecting that a temporal offset between the first multicast transmission and a unicast transmission to the first other terminal is less than the second threshold; and transitioning a second other one of the plurality of terminals to the second multicast transmission responsive to determining that a temporal offset between the second multicast transmission and a unicast transmission to the second other terminal is less than a third threshold;

to repeat transitioning another one of the plurality of terminals until each of the plurality of terminals is transitioned to one of the first multicast transmission and the second multicast transmission;

to adjust relative rates of the first multicast transmission and the second multicast transmission; and to transition terminals from the second multicast transmission to the first multicast transmission responsive to detecting that a temporal offset between the first multicast transmission and the second multicast transmission is less than a fourth threshold.

22. A non-transitory computer-readable storage medium having embodied therein one or more software programs that when executed by a processor of a processing device cause the processing device:

to identify a plurality of terminals receiving a given content stream via respective unicast transmissions, two or more of the unicast transmissions being temporally offset from one another;

to starting a multicast transmission of the given content stream responsive to detecting that the unicast transmissions of the given content stream meet a first threshold;

to identify a first one of the plurality of terminals based on temporal offsets between a unicast transmission to the first terminal and respective unicast transmissions to remaining ones of the plurality of terminals;

to transition the first terminal to the multicast transmission;

to adjust relative rates of the multicast transmission and the respective unicast transmissions to the remaining ones of the plurality of terminals; and to transition another one of the plurality of terminals to the multicast transmission responsive to detecting that a temporal offset between the multicast transmission and a unicast transmission to the other terminal is less than a second threshold.

\* \* \* \* \*